(12) United States Patent
Kong et al.

(10) Patent No.: US 11,382,267 B2
(45) Date of Patent: Jul. 12, 2022

(54) HARVESTING HEADER HEIGHT CONTROL (71) Applicant: CNH Industrial America LLC, New Holland, PA (US)

(72) Inventors: Neseth Cora Kong, Lancaster, PA (US); Cory Douglas Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 315 days.

(21) Appl. No.: 16/743,665

(22) Filed: Jan. 15, 2020

(65) Prior Publication Data
US 2021/0212248 A1    Jul. 15, 2021

(51) Int. Cl.
*A01D 34/28* (2006.01)
*A01D 41/14* (2006.01)

(52) U.S. Cl.
CPC ......... *A01D 41/141* (2013.01); *A01D 34/283* (2013.01); *A01D 41/144* (2013.01); *A01D 41/145* (2013.01)

(58) Field of Classification Search
CPC .. A01D 41/141; A01D 41/144; A01D 41/145; A01D 34/28; A01D 34/283; A01D 34/286
See application file for complete search history.

(56) References Cited

U.S. PATENT DOCUMENTS

| | | | |
|---|---|---|---|
| 4,136,508 A | 1/1979 | Coleman et al. | |
| 4,776,153 A * | 10/1988 | DePauw | A01D 41/145 56/10.2 E |
| 5,577,373 A * | 11/1996 | Panoushek | A01D 41/141 56/10.2 E |
| 6,588,187 B2 | 7/2003 | Engelstad et al. | |
| 7,647,753 B2 | 1/2010 | Schlipf | |
| 7,874,132 B2 * | 1/2011 | Sauerwein | A01D 41/141 56/10.2 E |
| 9,986,685 B2 | 6/2018 | Smith et al. | |
| 10,244,680 B2 | 4/2019 | Schlipf et al. | |
| 10,959,374 B2 * | 3/2021 | Duerksen | A01D 57/20 |
| 2017/0064904 A1 * | 3/2017 | Figgins | A01D 34/006 |
| 2018/0228086 A1 * | 8/2018 | Cook | A01D 41/141 |

FOREIGN PATENT DOCUMENTS

| AU | 2017203981 A1 | 1/2019 |
|---|---|---|
| EP | 2695511 A1 | 2/2014 |

OTHER PUBLICATIONS

Extended European Search Report for EP Application No. 2115886.5 dated Jun. 14, 2021 (six pages).

* cited by examiner

*Primary Examiner* — Adam J Behrens
(74) *Attorney, Agent, or Firm* — Peter Zacharias; Patrick Sheldrake (57) ABSTRACT

Method and apparatus for controlling the height of a header for use with an agricultural harvester. The header height is controlled by detecting a first height value of the header with respect to ground, detecting a second height value of the header with respect to ground, selecting a representative height value (e.g., the smallest height value) from the first and the second height values, and controlling the position of the header with respect to the agricultural harvester responsive the selected representative height value.

20 Claims, 10 Drawing Sheets

HARVESTING HEADER HEIGHT CONTROL

FIELD OF THE INVENTION

Examples of the present invention relate generally to a header of an agricultural harvester (i.e., a plant cutting machine) and, more specifically, to determining and controlling the height of the header above ground level.

BACKGROUND OF THE INVENTION

An agricultural harvester, such as, but not limited to, a combine or a windrower, generally includes a header operable for severing and collecting plant or crop material as the harvester is driven over a crop field. In order to minimize harvesting time, the width of the header has been increased over the years to harvest more crop during each pass of the harvester.

As the widths of the headers have increased, articulated headers (headers with more than one segment) have been developed to more closely follow the contours of the field. Additionally, outward segments of these articulated headers may be raised to avoid flooded areas of a field that could bog down the header. The height of the header (or portions thereof) above ground may be monitored using feeler arms.

SUMMARY OF THE INVENTION

A harvesting apparatus that includes a harvester, a header coupled to the harvester, a first height sensor configured and positioned to detect a first value representing height above ground at a first location on the header, a second height sensor configured and positioned to detect a second height value representing height above ground at a second location on the header, positioning machinery configured to selectively position at least one aspect of the header with respect to the harvester, and a controller. The controller is coupled to the first height sensor, the second height sensor, and the positioning machinery and is configured to receive the first and second height values, select a representative height value (e.g., the smallest) from the first and the second height values, and control the positioning machinery to position the header responsive the selected representative height value.

A method for controlling the height of a header for use with an agricultural harvester. The header height is controlled by detecting a first height value of the header with respect to ground, detecting a second height value of the header with respect to ground, selecting a representative height value (e.g., the smallest) from the first and the second height values, and controlling the position of the header with respect to the agricultural harvester responsive the selected representative height value.

BRIEF DESCRIPTION OF THE DRAWINGS

For the purpose of illustration, there are shown in the drawings some examples of the invention. It should be understood, however, that the invention is not limited to the precise arrangements, dimensions, and instruments shown. Like numerals indicate like elements throughout the drawings. When more than one of the same or similar elements are depicted a common reference number may be used with a letter designation corresponding to respective elements. When the elements are referred to collectively or a non-specific element is referenced, the letter designation may be omitted. In the drawings.

DETAILED DESCRIPTION OF THE INVENTION

Reference will now be made in detail to the various examples of the subject disclosure illustrated in the accompanying drawings. According to examples described herein, header height above ground is detected at multiple locations across the width of the header (e.g., at each float arm). Header heights from adjacent locations are combined, with the lowest header height selected as the height for use in controlling the height of the header. This guards against the use of uncharacteristic values that may be detected, e.g., by a feeler arm that is in a tire rut.

Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The term "crop material" is used throughout the specification for convenience and it should be understood that this term is not intended to be limiting. The header of the subject application is applicable to a variety of crops, including but not limited to wheat, soybeans and small grains.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the signals or light.

The term "about" as used herein when referring to a measurable value such as an amount, a temporal duration, and the like, is meant to encompass variations of ±20%, ±10%, ±5%, ±1%, or ±0.1% from the specified value, as such variations are appropriate.

The term "substantially" as used herein shall mean considerable in extent, largely but not wholly that which is specified, or an appropriate variation therefrom as is acceptable within the field of art.

Throughout the subject application, various aspects thereof can be presented in a range format. It should be understood that the description in range format is merely for convenience and brevity and should not be construed as a limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the examples of the subject disclosure may be combined in any suitable manner in one or more embodiments. One skilled in the relevant art will recognize, in light of the description herein, that the subject disclosure can be practiced without one or more of the specific features or advantages of a particular example. In other instances, additional features and advantages may be recognized in certain embodiments that may not be present in all examples of the present disclosure.

Figure 1:
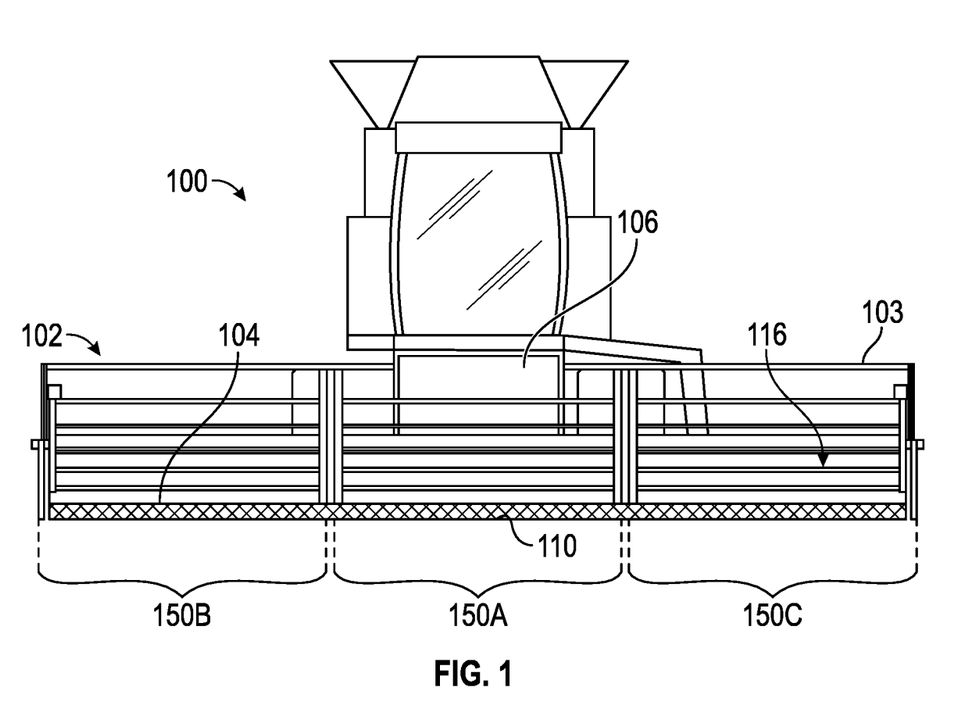
FIG. 1 is a front view of a harvester with attached articulating header in accordance with examples described herein.

Referring now to the drawings, FIG. 1 illustrates an agricultural harvester 100 for harvesting crop material in accordance with an example of the present disclosure. For exemplary purposes only, the agricultural harvester is illustrated as a combine harvester. The harvester 100 includes a header 102 attached to a forward end of the harvester, which is configured to cut crops, including (without limitation) small grains (e.g., wheat, soybeans, grain, etc.), and to induct the cut crops into a feeder house 106 as the harvester moves forward over a crop field.

The header 102 is an articulating header including a center segment 150A, a right wing segment 150B adjacent a right side of the center segment 150A, and a left with segment 150C adjacent a left side of the center segment. The center segment 150A is positioned in front of the feeder house 106 and may be raised/lowered with respect to the harvester 100. The right wing segment 150B and the left wing segment 150C may be raised/lowered to conform to the surface of the crop field. During normal operation, all three segments 150A/150B/150C are engaged in harvesting crop material from the crop field (referred to herein as the "operational state"). In certain situations, such as in an unusually wet/muddy portion of the crop field, the right and/or left wing segments 150B are raised such that they no longer effectively capture crop (referred to herein as a "raised state") in order to prevent the header 102 from getting bogged down in the crop field.

The header 102 includes a frame 103 having a floor 104 that is supported in desired proximity to the surface of a crop field. The center, right, and left segments 150A, 150B, and 150C extend transversely along a forward edge of the floor 104, i.e., in a widthwise direction of the harvester. The center, right, and left segments 150A, 150B, and 150C are configured to cut crops in preparation for induction into the feeder house 106. The header 102 may include one or more draper conveyor belts for conveying cut crops to the feeder house 106, which is configured to convey the cut crops into the harvester for threshing and cleaning as the harvester 100 moves forward over a crop field. The header 102 may include an elongated, rotatable reel 116 which extends above and in close proximity to the segments 150A, 150B, and 150C. The rotatable reel 116 is configured to cooperate with the one or more draper conveyors in conveying cut crops to the feeder house 106 for threshing and cleaning. According to an example as shown in FIG. 1, a cutter bar 110 is positioned in front of the segments 150A, 150B, and 150C.

Figure 2A:
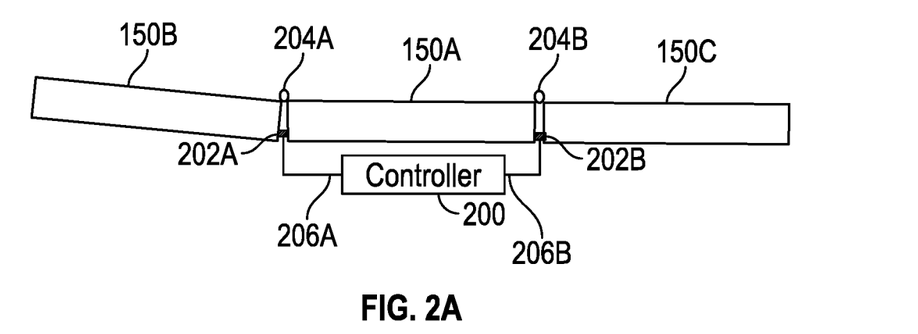
FIGS. 2A, 2B, 2C, and 2D are views of four respective states of an articulating header in accordance with examples described herein.
Figure 2B:
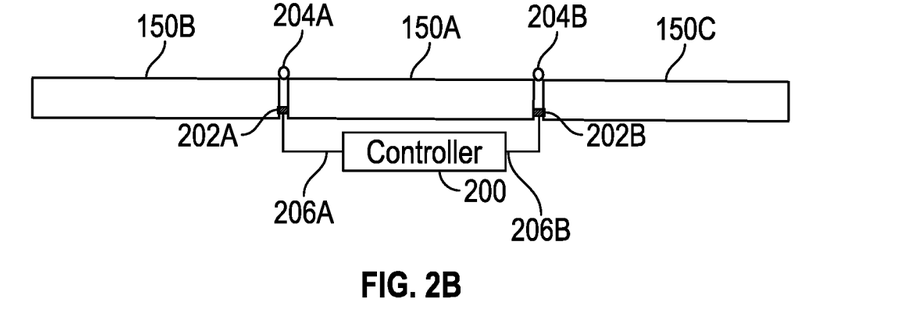
Figure 2C:
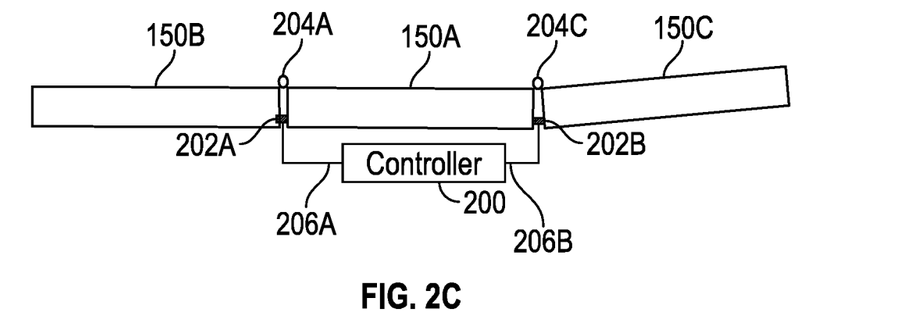
Figure 2D:
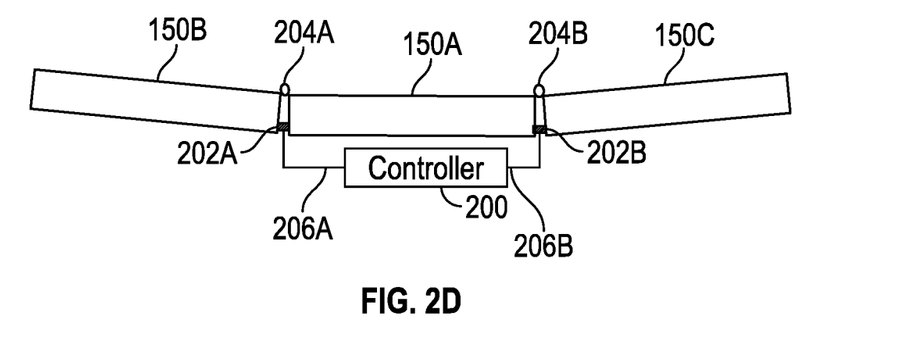

FIGS. 2A, 2B, 2C, and 2D depict the header 102 with its segments 150 in various states of operation. FIG. 2A depicts the header 102 with the center segment 150A and the left segment 150C in an operational state, and the right segment 150B in a non-operational state. FIG. 2B depicts the header 102 with all segments 150 in the operational state. FIG. 2C depicts the header 102 with the center segment 150A and the right segment 150B in an operational state, and the left segment 150C in a non-operational state. FIG. 2D depicts the header 102 with the center segment 150A in an operational state, and the left segment 150C and the right segment 150B in non-operational states.

In one example, positioning machinery including a hydraulic control apparatus 200 and hydraulic cylinders 202. The hydraulic control apparatus 200 (e.g., under control of a microprocessor of the harvester 100 or located in the header 102) controls a first hydraulic cylinder 202A positioned between the center segment 150A and the right segment 150B and a second hydraulic cylinder 202A positioned between the center segment 150A and the left segment 150C. The controller 200 controls the flow of hydraulic fluid through respective first and second fluid lines 206A and 206B to the first and second hydraulic cylinders 202A and 202B.

Increasing the pressure in the first fluid line 206A causes the hydraulic cylinder 202A to extend, which results in the right wing segment 150B raising with respect to the center segment 150A (and into a non-operational state) as it rotates about a pivot point 204A therebetween. Decreasing the pressure in the first fluid line 206A causes the hydraulic cylinder 202A to retract, which results in the right wing segment 150B lowering with respect to the center segment 150A (and into an operational state). Increasing the pressure in the second fluid line 206B causes the hydraulic cylinder 202B to extend, which results in the left wing segment 150C raising with respect to the center segment 150A (and into a non-operational state) as it rotates about a pivot point 204B therebetween. Decreasing the pressure in the second fluid line 206A causes the hydraulic cylinder 202B to retract, which results in the left wing segment 150C lowering with respect to the center segment 150A (and into an operational state).

Figure 3A:
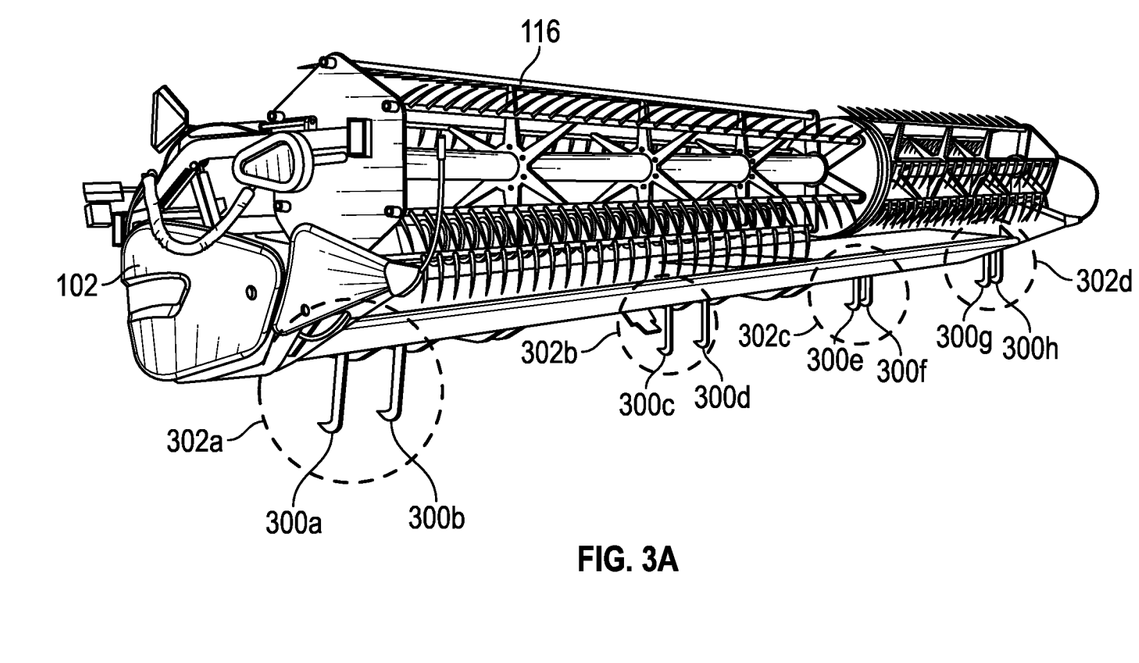
FIG. 3A is a perspective view of a header illustrating pairs of height sensors in accordance with examples described herein.

FIG. 3A depict a two-segment header 102 with height detectors extending from a bottom portion of the header. In the illustrated embodiment, the height detectors include feeler arms 300 (feeler arms 300*a-h*). As described in further detail below, the feeler arms 300 are grouped into feeler arm groups 302 (feeler arm groups 302*a-d*), with each feeler arm group 302 including a pair of feeler arms. Although each group 302 is illustrated and described as including a pair of feeler arms 300, a group 302 may include more than two feeler arms 300.

Figure 3B:
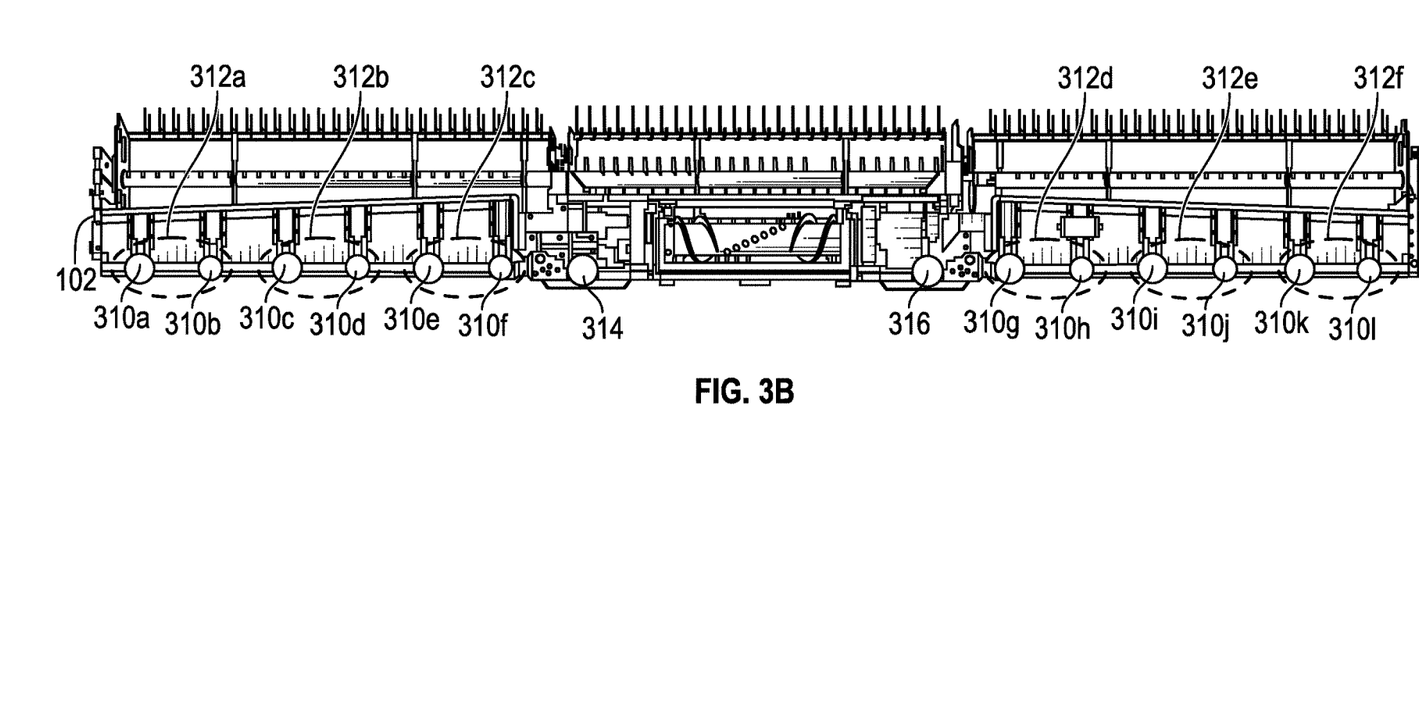
FIG. 3B is a bottom view of a header illustrating pairs of height sensors in accordance with examples described herein.

FIG. 3B depict a three-segment header 102 with height detectors 310 (height detectors 310*a-1*) extending from a bottom portion of the header. In the illustrated embodiment, the height detectors 310 may be feeler arms 300 such as described above with respect to FIG. 3A or may be another type of height sensor such as a laser distance sensor. Some of the height detectors 310 (e.g., height detectors 310*a-1*) are grouped into height detector groups 312 (height detector groups 312*a-f*), with each height detector group 312 including a pair of height detectors 310, and other height detectors (e.g., height detectors 314 and 316) may stand alone. Although each group 312 is illustrated and described as including a pair of height detectors 310, a group 312 may include more than two height detectors 310.

The height detectors 310 are spaced across the width of the header 102. In the illustrated embodiment, each height detector 310 is positioned adjacent a respective float arm (see float arm 400; FIG. 4) of the header. Combining the detected heights from adjacent float arm positions and selecting a representative height value (e.g., the smallest) for controlling the header prevents unwanted changes in header height due to abnormalities in the ground surface (e.g., lowering the header 102 when a height sensor is in a tire rut). Additionally, finer granularity of height measurement across the header 102 can be obtained and processed without increasing the number of inputs to a processor.

Figure 4A:
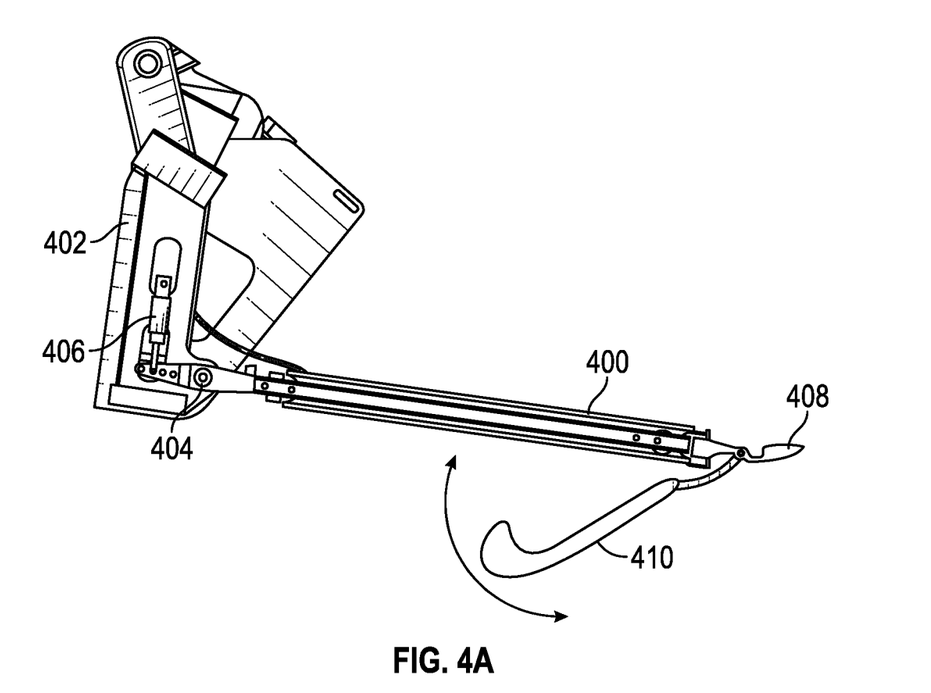
FIG. 4A is an illustration of a height sensor for use in determining the height of a portion of a header above ground using a feeler arm in accordance with examples described herein.

FIG. 4A depicts a float arm 400 with a height detector embodied as a feeler arm 410 for "above-ground" cutting. The float arm 400 is coupled to a support structure 402 of the header 102. The float arm 400 rotates about a pivot point 404 on the support structure 402 to enable the front of the header 102 to "float" over the crop field. A hydraulic cylinder 406 is coupled to the float arm 400 on one side of the pivot point 404 and a cutter bar 408 is coupled to the float arm 400 on the other side of the pivot point 404. Pressure to the hydraulic cylinder 406 is controlled to raise/lower the float arm 400 (and, in turn, the cutter bar 408), e.g., in order to maintain the cutter bar 408 at a set height above the ground of the crop field.

Figure 4B:
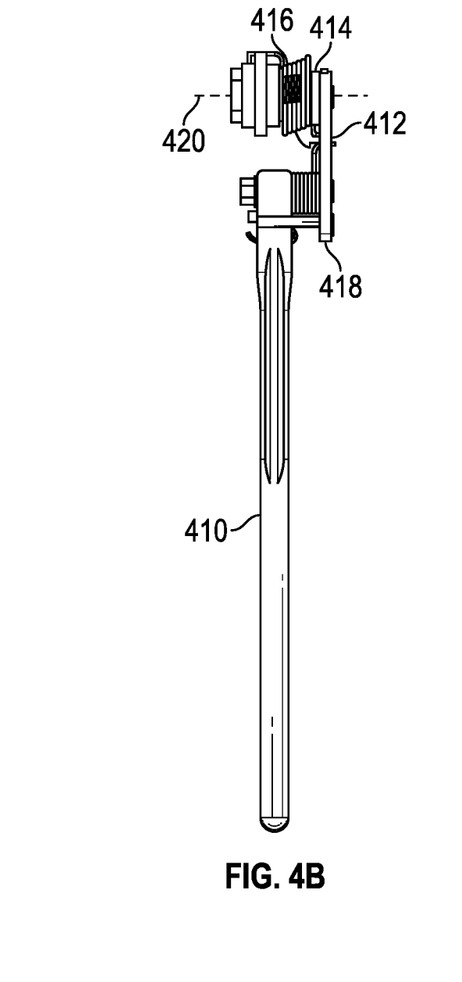
FIG. 4B is a rear view of the feeler arm for use in the height sensor of FIG. 4A.

FIG. 4B depicts the feeler arm 410 from a rear point of view. The feeler arm 410 may be formed using a flexible polymer. This allows the feeler arm 410 to flex, which absorbs shock as the feeler arm 410 is dragged over the ground (thereby extending its useful life). A coupler 412 couples the feeler arm 410 to a bushing at a pivot point 414 on the float arm 400, e.g., near the cutter bar 408. The coupler 412 enables the feeler arm 410 to rotate about a pivot axis 420 extending through the pivot point 414. A down pressure spring 416 urges the feeler arm 410 toward the ground and a reverse spring trip 418 allows the feeler arm 410 to flip forward in the event the harvester is moved in reverse.

Figure 4C:
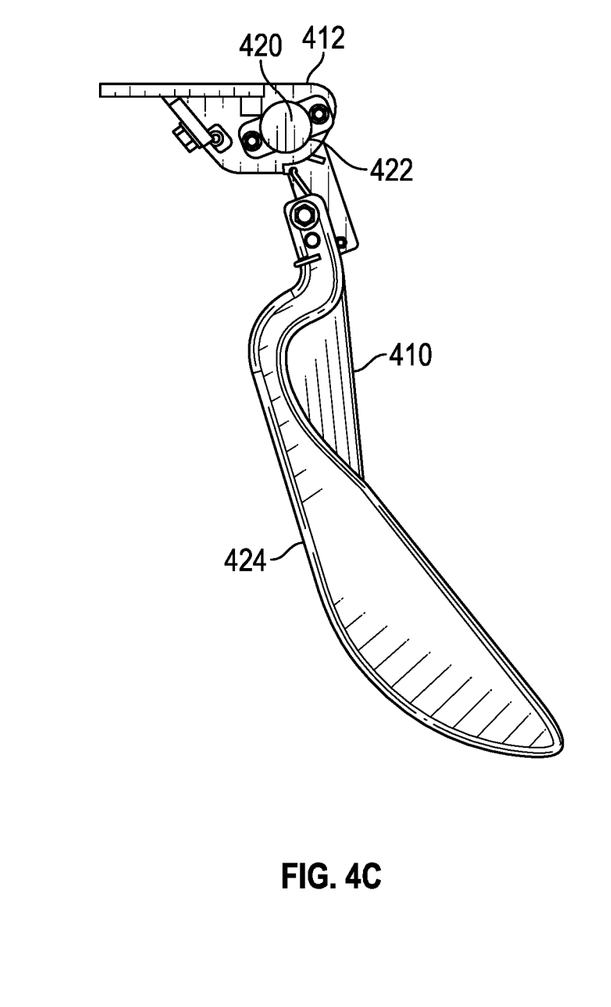
FIG. 4C is a side view of the feeler arm for use in the height sensor of FIG. 4A.

FIG. 4C depicts the feeler arm 410 from a side view. A rotation sensor 422 (e.g., a proximity sensor such as a Hall effect sensor) is positioned adjacent the pivot point 414 to sense rotation of the feeler arm 410 about the pivot axis 420. Where the rotation sensor 422 is a Hall effect sensor, a magnetic field is used to sense rotational angles (which correspond to the distance the portion of the header to which the feeler arm is attached is above ground) without the need for additional moving parts. A forward edge 424 of the feeler arm 410 is curved, which moves the sensing point of the feeler arm 410 forward as the feeler arm nears the ground.

Figure 4D:
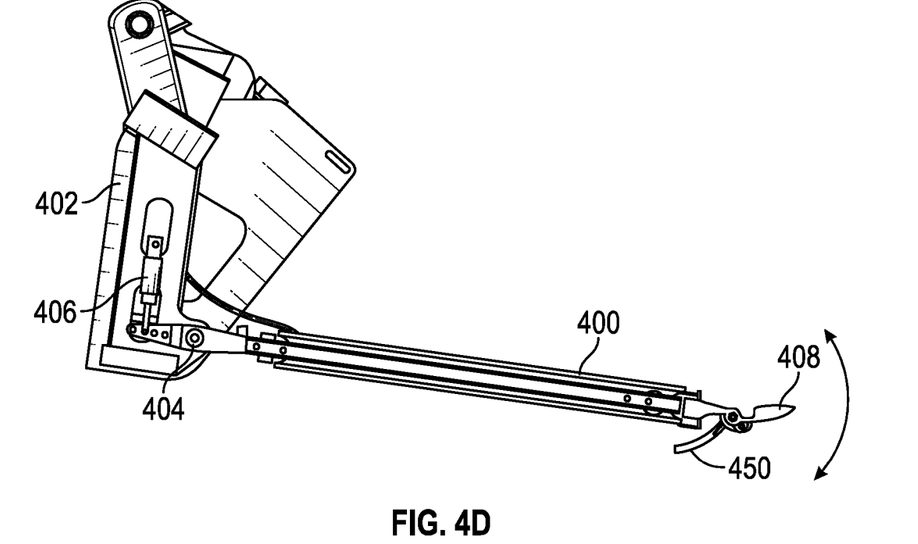
FIG. 4D is an illustration of another height sensor for use in determining the height of a portion of a header above ground in accordance with examples described herein.

FIG. 4D depicts a float arm 400 with a height detector embodied as a rotational sensor (not shown) adjacent the pivot point 404 of the float arm 400 for "on-the-ground" cutting. The float arm 400 is coupled to a support structure 402 of the header 102. The float arm 400 rotates about a pivot point 404 on the support structure 402 and includes a skid plate 450 to enable the front of the header 102 to move along the surface of the crop field at ground level. A hydraulic cylinder 406 is coupled to the float arm 400 on one side of the pivot point 404 and a cutter bar 408 is coupled to the float arm 400 on the other side of the pivot point 404. Pressure to the hydraulic cylinder 406 is controlled to raise/lower the float arm 400 (and, in turn, the cutter bar 408), e.g., in order to maintain the cutter bar 408 at the crop field ground level.

Figure 5A:
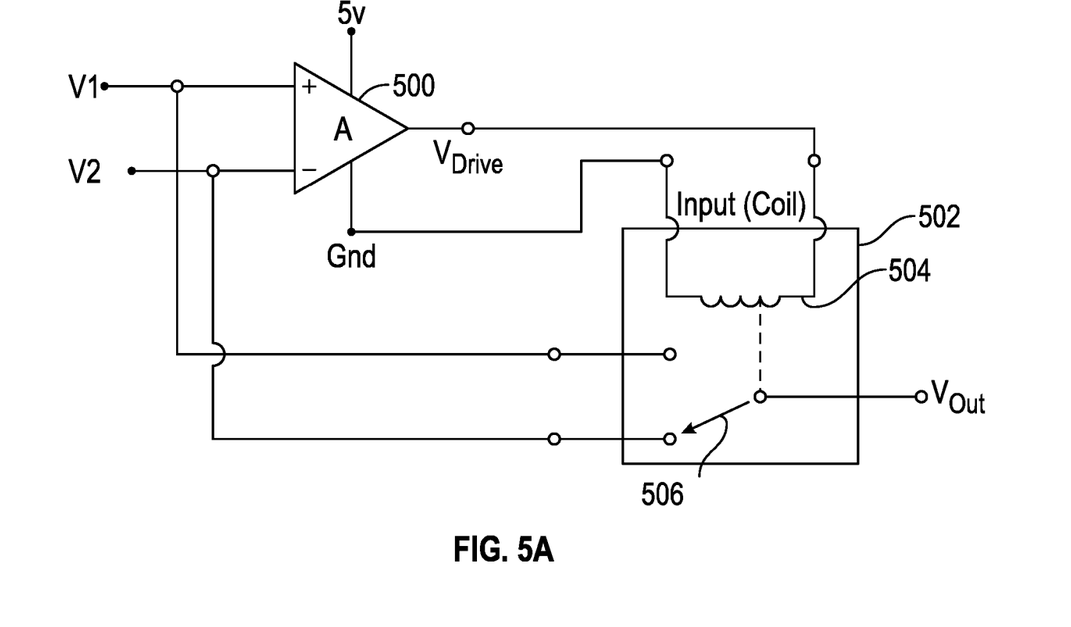
FIGS. 5A and 5B are circuit diagrams of two respective sensor selectors for use with a pair of height sensors in accordance with examples described herein.

FIG. 5A depicts a selector circuit overview for receiving multiple height values and selecting/passing a representative height value (e.g., the smallest) from the received height values. The illustrated selector circuit includes a comparator 500 and a selector 502. The selector 502 includes an inductor coil 504 and a switch 505. In FIG. 5A, the switch 506 of the selector is positioned to pass the voltage value V2 (e.g., the voltage from a second height sensor). If a voltage value V1 (e.g., voltage from a first height sensor adjacent the second height sensor) is less than V2, the output of the comparator 500 is equal to ground (GND). In this configuration, the inductor coil 504 is not energized and the switch remains positioned to pass the voltage value V2. On the other hand, if the voltage value V1 is greater than V2, the output of the comparator 500 is equal to five volts (5v). In this configuration, the inductor coil 504 is energized and the switch is moved to pass the voltage value V1.

Figure 5B:
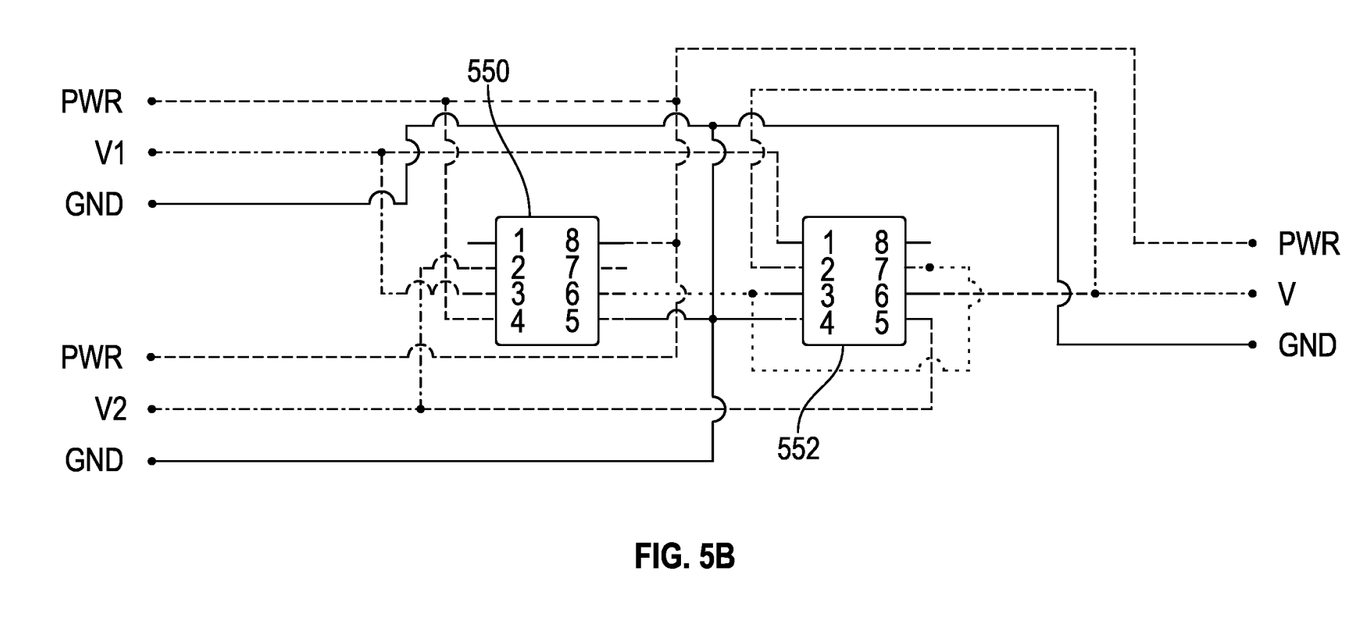

FIG. 5B depicts a selector circuit implemented using integrated circuitry for receiving multiple height values and selecting/passing a representative height value (e.g., the smallest) from the received height values. The illustrated selector circuit includes an integrated circuit comparator 550 (such as a TL712CP C DIFF COMPARATOR 8-DIP available from Texas Instruments of Dallas, Tex., USA) and an integrated circuit switch 552 (such as a MAX325 Analog Switch available from Maxim Integrated of San Jose, Calif., USA).

The comparator 550 includes a positive input pin (PIN 3) coupled to V1 and inverting input pin (PIN 2) coupled to V2. The comparator 550 additionally includes a power pin (PIN 4) coupled to a power source (PWR), a ground pin (PIN 5) coupled to ground (GND), and an output pin (PIN 6) responsive to the V1 and V2 values. The switch 552 includes a normally open pin (PIN 1) connected to V1 and a normally closed pin (PIN 5) connected to V2. The switch 552 additionally includes a positive voltage pin (PIN 8) coupled to a power source (PWR), a negative voltage pin (PIN 4) coupled to ground (GND), a first output pin (PIN 2), and a second output pin (PIN 6). The first and second output pins of the switch 552 are tied together to provide an output voltage (V) for use as a representative value for determining height of the header adjacent the sensors producing V1 and V2. A first input pin (PIN 7) of switch 552 actuates a normally open switch within the switch 552 (coupling/uncoupling V1 to the output V) and a second input pin (PIN 3) of switch 552 actuates a normally closed switch within the switch 552 (uncoupling/coupling V2 to the output V).

If V2 is less than V1, the comparator 550 produces a low value at the output pin of the comparator, which is presented to the first and second input pins of the switch 552 (leaving the normally open switch open and the normally closed switch closed). This configuration results in V2 being presented as the output voltage V. If V1 is less than V2, the comparator 550 produces a high value at the output pin of the comparator, which is presented to the first and second input pins of the switch 552 (closing the normally open switch and opening the normally closed switch). This configuration results in V1 being presented as the output voltage V.

Figure 6:
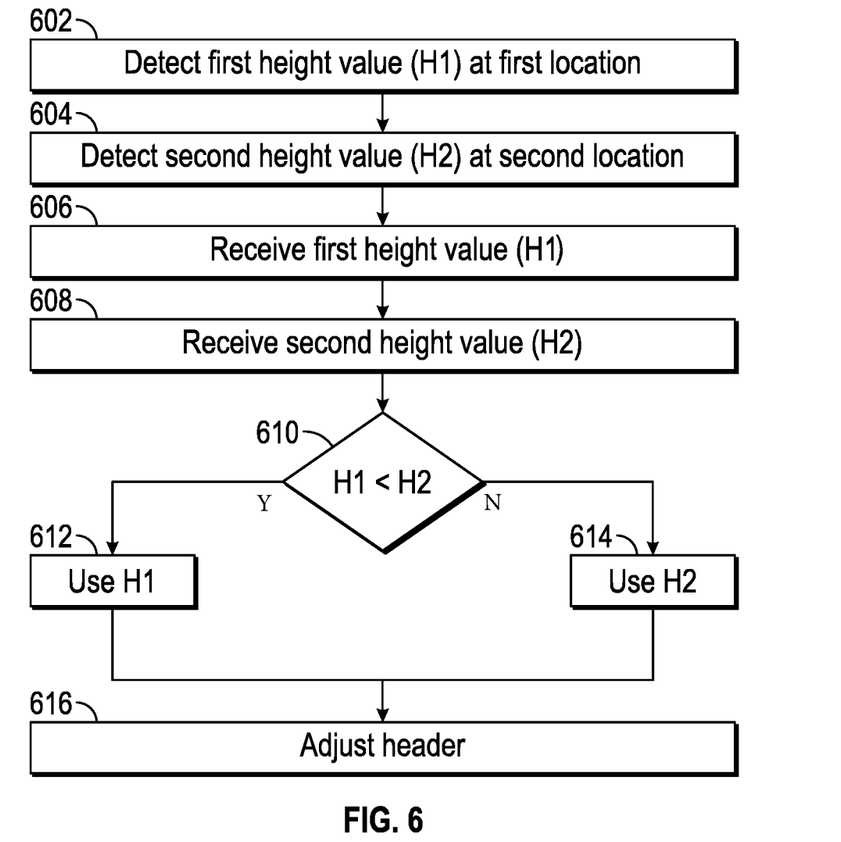
FIG. 6 is a flow chart for depicting a selection process for selecting height information for determining header height from height information provided by a pair of height sensors in accordance with examples described herein.
Figure 7:
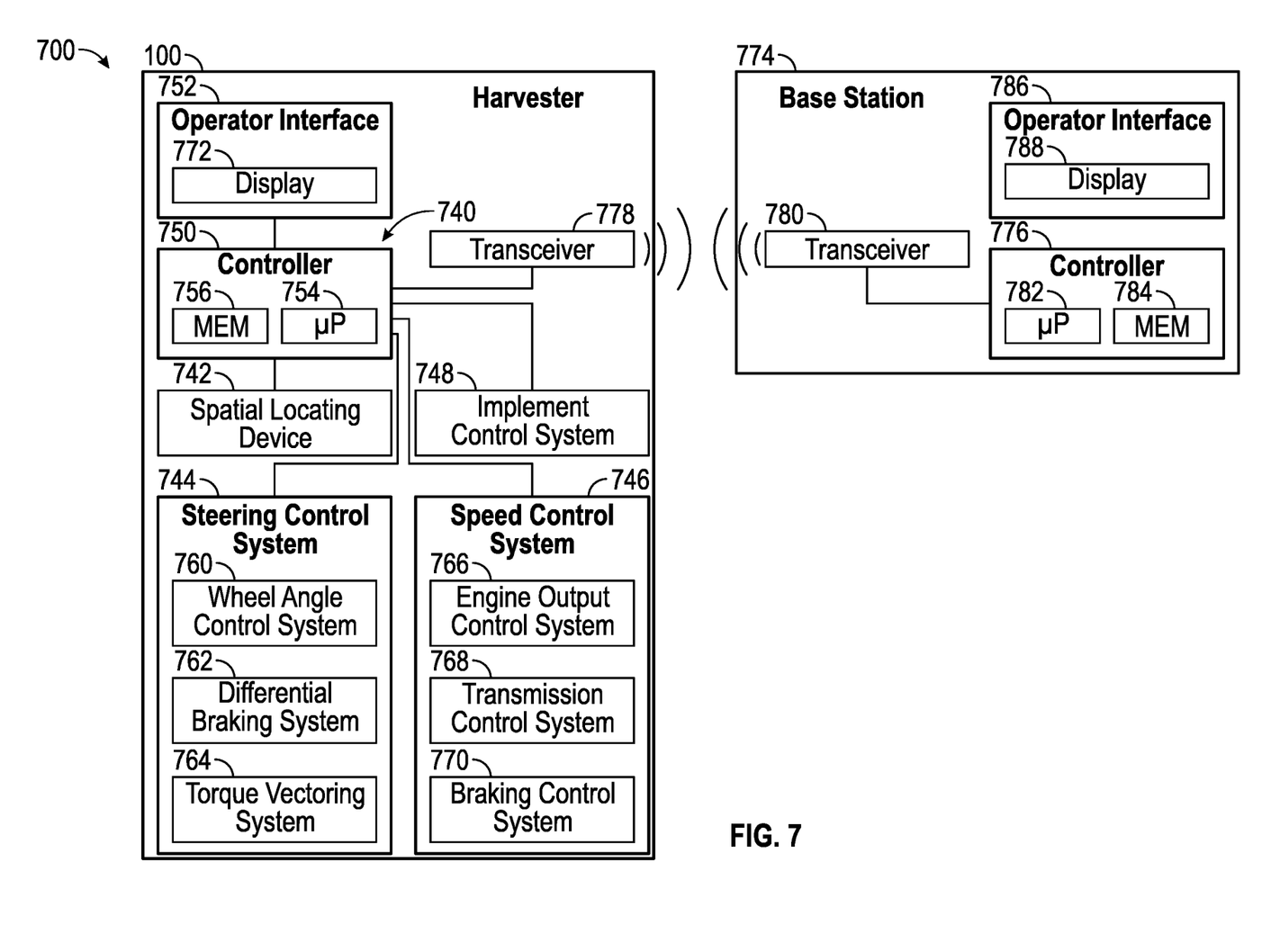
FIG. 7 is a block diagram depicting components for use in implementing apparatus and examples described herein.

FIG. 6 depicts a flow chart 600 of example steps for selecting height information from a pair of height sensors for use in determining the height of a portion of a header above ground. The steps may be performed by a processor (e.g., microprocessor 754 and/or 782; FIG. 7) executing instruction stored in a memory (e.g., memory 756 and/or 784), sensors, and/or circuit described herein. The steps are described with reference to hardware described herein, but are not to be limited to such implementations. Although shown as occurring serially, the blocks of FIG. 6 may be reordered or parallelized depending on the implementation. Additionally, although two sensors are described, it will be apparent that additional groups of two or more sensors may be processes in order to obtain sufficient information across the entire width of the header to accurately maintain header height. Furthermore, one of skill in the art will understand from the description herein that one or more steps/blocks may be omitted and one or more additional/alternative steps may be incorporated.

At block 602, a first height sensor detects a first height value (H1) at a first location on a header and, at block 604, a second height sensor detects a second height value (H1) at a second location on the header. The first and second height sensors may be position adjacent respective float arms 400. The first and second height sensors each may be a feeler arm height sensor such as depicted in FIGS. 4B and 4C. The height sensor may be positioned on a float arm such as float arm 400 (FIG. 4A) or at an interface between the float arm 400 and a support structure 402 for the float arm (FIG. 4D).

At block 606, a controller receives the first height value and, at block 608, the controller receives the second height value. The controller includes a processor (e.g., microprocessor 754 and/or 782; FIG. 7) and a selector (e.g., comparator 500/550 and switch 502/552). The selector may be located on the header 102 and the processor may be located in the harvester 100 and/or at a remote location.

At block 610, the selector compares the first and second height values and selects a representative height value (e.g., a height value representing the nearest height above the ground). In the illustrated flow chart, if the first height value (H1) corresponds to a smaller height value than the second height value (H2), processing proceeds at block 612 with the first height value (H1) being used in calculations for determining header height. If the second height value (H2) corresponds to a smaller height value than the first height value (H1), processing proceeds at block 614 with the second height value (H1) being used in calculations for determining header height. If the height sensors include Hall effect proximity sensors that generate a voltage, the height values H1 and H2 correspond to the voltage values V1 and V2 (FIGS. 5A and 5B), respectively. It is to be understood that the selector system may be designed such that larger values correspond to larger distances or such that smaller values correspond to larger distances. Suitable variations in design will be understood by one of skill in the art from the description herein.

At blocks 612 and 614, the processor determines height of the header in the vicinity of the header where the sensors are located, using H1 where H1 is less than H2 and using H2 where H2 is less than H1. The processor may determine actual height or an equivalent for adjustment purposes based on, for example, a look-up table stored in memory. Alternatively, the processor may calculate actual height or an equivalent for adjustment purposes using an algorithm retrieved from memory.

At block 616, the processor adjusts the header to maintain the header at a set height responsive to the height values. The processor may raise/lower the entire header, one or both wings of a three-part header, or one or more float arms responsive to the height values from the height sensors on the header.

FIG. 7 is a schematic diagram of an embodiment of a control system 700 that may be utilized to control the harvester 100, control the header 102 (including reel height), and/or detect crop field parameters (e.g., height for the header above ground by implementing algorithms such as the algorithm depicted and described with reference to FIG. 6). In the illustrated example, the control system 700 includes a vehicle control system 740 (e.g., mounted on the harvester 100). In the illustrated embodiment, the harvester 100 includes a spatial locating device 742, which is mounted to the harvester 100 and is configured to determine a position of the harvester 100. The spatial locating device 742 may also be configured to determine a heading and/or a speed of the harvester 100, for example. As will be appreciated, the spatial locating device 742 may include any suitable system configured to determine the position and/or other characteristics of the harvester 100, such as a global positioning system (GPS) or global navigation satellite system (GNSS), for example.

In the illustrated example, the harvester 100 includes a steering control system 744 configured to control a direction of movement of the harvester 100, and a speed control system 746 configured to control a speed of the harvester 100. The illustrated steering control system includes a wheel angle control system 760, a differential braking system 762, and a torque vectoring system 764 that may be used to steer (e.g., adjust the steering angle of) the harvester 100. The illustrated speed control system 746 includes an engine output control system 766, a transmission control system 768, and a braking control system 770. In addition, the harvester 100 includes an implement control system 748 configured to control operation of an implement (e.g., height of the header 102 and operational states of the header segments 150) and to determine crop field parameters (such as height of the header above ground) from, for example, height sensors coupled to the header 102. Furthermore, the control system 740 includes a controller 750 communicatively coupled to the spatial locating device 742, to the steering control system 744, to the speed control system 746, and to the implement control system 748.

In some examples, the controller 750 is an electronic controller having electrical circuitry configured to process data from the spatial locating device 742, among other components of the harvester 100. In the illustrated example, the controller 750 includes a processor, such as the illustrated microprocessor 754, and a memory device 756. The controller 750 may also include one or more storage devices and/or other suitable components. The processor 754 may be used to execute software, such as software for calculating a target position, iteratively calculating virtual paths, controlling the harvester 100, and so forth. Moreover, the processor 754 may include multiple microprocessors, one or more "general-purpose" microprocessors, one or more special-purpose microprocessors, and/or one or more application specific integrated circuits (ASICS), or some combination thereof. For example, the processor 754 may include one or more reduced instruction set (RISC) processors.

The memory device 756 may include a volatile memory, such as random access memory (RAM), and/or a nonvolatile memory, such as ROM. The memory device 756 may store a variety of information and may be used for various purposes. For example, the memory device 56 may store processor-executable instructions (e.g., firmware or software) for the processor 754 to execute, such as instructions for controlling the harvester 100 (e.g., header height and segment state). The storage device (s) (e.g., a nonvolatile/non-transitory storage medium) may include read-only memory (ROM), flash memory, a hard drive, or any other suitable optical, magnetic, or solid-state storage medium, or a combination thereof. The storage device (s) may store data (e.g., field maps, maps of desired paths, vehicle characteristics, etc.), instructions (e.g., software or firmware for calculating crop field parameters such as header height above ground and any other suitable data.

The implement control system 748 is configured to control various parameters of the agricultural implement towed by or integrated within the harvester 100. For example, in certain examples, the implement control system 748 may be configured to instruct an implement controller (e.g., via a communication link, such as a CAN bus or ISOBUS) to adjust a penetration depth of at least one ground engaging tool of the agricultural implement, which may reduce the draft load on the harvester 100. Furthermore, the implement control system 48 may instruct the implement controller to adjust header height, to transition the agricultural implement between a working position and a transport portion, to adjust a flow rate of product from the agricultural implement, to adjust a position of a header of the agricultural implement (e.g., a harvester, etc.), or to adjust which segments of an articulated header are operational/non-operational, among other operations.

In the illustrated example, the operator interface 752 may be communicatively coupled to the controller 750. The operator interface 752 is configured to present data from the harvester 100 and/or the agricultural implement to an operator (e.g., data associated with operation of the harvester 100, data associated with operation of the agricultural implement, a position of the harvester 100, a speed of the harvester 100, the desired path, the virtual paths, the target position, the current position, etc.) via a display 772. The operator interface 752 may also be configured to enable an operator to control certain functions of the harvester 100 (e.g., starting and stopping the harvester 100, inputting the desired path, raising lower the header, raising/lowering the reel 116 etc.).

It should be appreciated that in certain embodiments, the control system 40 may include a base station 774 having a base station controller 776 located remotely from the harvester 100. For example, in certain embodiments, control functions of the control system may be distributed between the controller 750 of the harvester 100 and the base station controller 776. In some embodiments, the base station controller 776 may perform a substantial portion of the control functions of the control system. For example, in some examples, a first transceiver 778 positioned on the harvester 100 may output signals indicative of vehicle characteristics (e.g., the speed, maximum turning rate, minimum turning radius, steering angle, roll, pitch, rotational rates, acceleration, reel height, or any combination thereof), the position, and/or the heading of the harvester 100 to a second transceiver 780 at the base station 774. The base station control 776 may have a processor 782 and memory device 784 having all or some of the features and/or capabilities of the processor 754 and the memory device 756 discussed above. In some examples, the base station 774 may include an operator interface 786 having a display 788, which may have all or some of the features and/or capabilities of the operator interface 752 and the display 772 discussed above.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A harvesting apparatus comprising:
    a harvester;
    a header coupled to the harvester;
    a first group of height sensors configured and positioned to detect a first height value representing height above ground at a first location on the header and a second height value representing height above ground at a second location on the header, wherein the second location is adjacent the first location;
    a second group of height sensors configured and positioned to detect a third height value representing height above ground at a third location on the header and a fourth height value representing height above ground at a fourth location on the header, wherein the fourth location is adjacent the third location;
    positioning machinery configured to selectively position at least one aspect of the header with respect to the harvester; and
    a controller coupled to the first group of height sensors, the second group of height sensors, and the positioning machinery, the controller configured to:
        receive the first, second, third, and fourth height values;
        select a first representative height value from the first and the second height values and a second representative height value from the third id the fourth height values; and
        control the positioning machinery to position the header responsive the selected first and second representative height values.

2. The apparatus of claim 1, wherein the first group of height sensors includes a first sensor configured to detect the first height value and a second it sensor configured to detect the second height value and wherein the controller comprises:
    a processor configured to control the positioning machinery; and
    a selector positioned between the processor and the first and second height sensors, the selector configured to select the first representative height value from the first and second height values.

3. The apparatus of claim 2, wherein the selector comprises:

a switch coupled to the first height sensor, the second height sensor and the processor, the switch configured to pass either the first height value or the second height value responsive to a selection input; and a comparator coupled to the first height sensor, the second height sensor, and the switch, the comparator configured to generate the selection input responsive to a difference between the first height value and the second height value.

4. The apparatus of claim 3, wherein the selector comprises an integrated circuit including at least one of the switch or the comparator.

5. The apparatus of claim 3, wherein the comparator is an analog comparator.

6. The apparatus of claim 1, wherein the first group of height sensors includes a first height sensor configured to detect the first height value and a second height sensor configured to detect the second height value and wherein the header includes a plurality of float arms, the first height sensor is coupled to a first of the plurality of float arms, and the second height sensor is coupled to a second of the plurality of float arms.

7. The apparatus of claim 6, wherein the first float arm is adjacent to the second float arm.

8. The apparatus of claim 6, wherein each of the first and second height sensors comprises:
a feeler arm pivotally coupled to a respective one of the first and second float arms at a pivot point; and
a proximity sensor positioned to sense rotation about the pivot point.

9. The apparatus of claim 1, wherein to select the representative height value the controller is configured to:
compare the first and second height values; and
identify one of the first or second height values representing the nearest height above the ground as the first representative height value.

10. A header for use with a harvester, the header comprising:
a first group of height sensors configured and positioned to detect a first height value representing height above ground at a first location on the header and a second height value representing height above ground at a second location on the header, wherein the second location is adjacent the first location;
a second group of height sensors configured and positioned to detect a third height value representing height above ground at a third location on the header and a fourth height value representing height above ground at a fourth location on the header, wherein the fourth location is adjacent the third location; and
a selector coupled to the first, second, third, and fourth height sensors, the selector configured to:
receive the first, second, third and fourth height values;
select a first representative height value from the first and the second height values and second representative height value from the third height values; and
send a signal to the header responsive the selected first representative height value.

11. The header of claim 10, wherein the first group of height sensors includes a first height sensor configured to detect the first height value and a second height sensor configured to detect the second height value and wherein the selector comprises:
a switch coupled to the first height sensor and the second height sensor, the switch configured to pass either the first height value or the second height value as the selected first representative height value responsive to a selection input; and
a comparator coupled to the first height sensor, the second height sensor, and the switch, the comparator configured to generate the selection input responsive to a difference between the first height value and the second height value.

12. The header of claim 11, wherein the selector comprises an integrated circuit including at least one of the switch or the comparator.

13. The header of claim 11, wherein the comparator is an analog comparator.

14. The header of claim 10, wherein the first group of height sensors includes a first height sensor configured to detect the first height value and a second height sensor configured to detect the second height value and wherein the header includes a plurality of float arms, the first height sensor is coupled to a first of the plurality of float arms, and the second height sensor is coupled to a second of the plurality of float arms.

15. The header of claim 14, wherein the first float arm is adjacent to the second float arm.

16. The header of claim 14, each of the first and second float arms includes a pivot point and wherein each of the first and second height sensors comprises:
a proximity sensor positioned to sense rotation about the pivot point.

17. The header of claim 14, wherein each of the first and second height sensors comprises:
a feeler arm pivotally coupled to a respective one of the first and second float arms at a pivot point; and
a proximity sensor positioned to sense rotation about the pivot point.

18. A method for controlling a header of an agricultural harvester, the method comprising:
detecting, at a first position on the header, a first height value of the header with respect to ground;
detecting, at a second position on the header, a second height value of the header with respect to ground, wherein the second position is adjacent the first position;
detecting, at a third position on the header, a third height value of the header with respect to ground;
detecting, at a fourth position on the header, a fourth height value of the header with respect to ground, wherein the fourth position is adjacent the third position;
selecting a first representative height value from the first and the second height values and a second representative height value from the third and the fourth height values; and
controlling the position of the header with respect to the agricultural harvester responsive the selected first and second representative height values.

19. The method of claim 18, wherein the header includes a plurality of float arms, a first height sensor is coupled to a first of the plurality of float arms to detect the first height value, and a second height sensor is coupled to a second of the plurality of float arms to detect the second height value.

20. The method of claim 19, wherein the first float arm is adjacent to the second float arm.

* * * * *